United States Patent Office 3,572,210
Patented Mar. 23, 1971

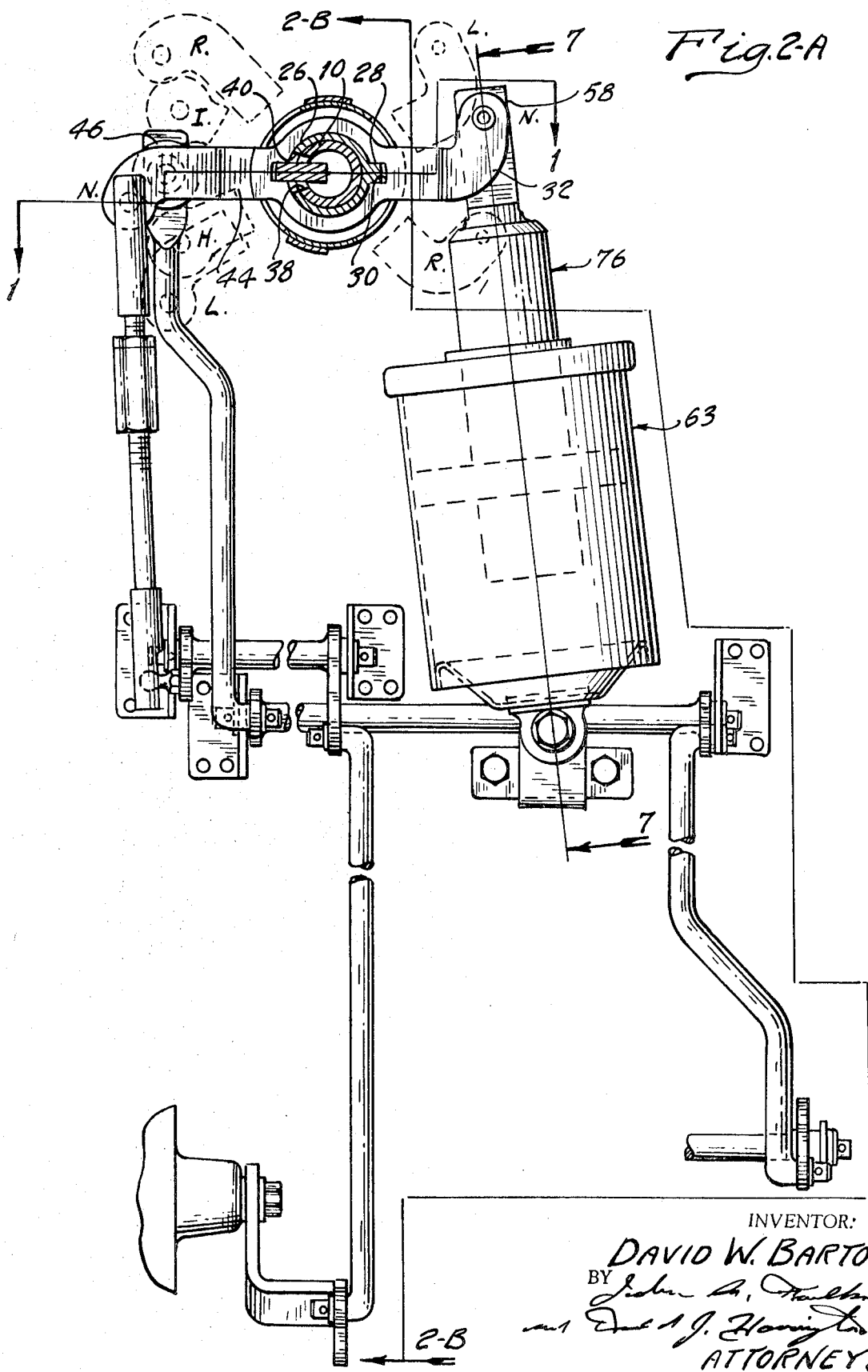

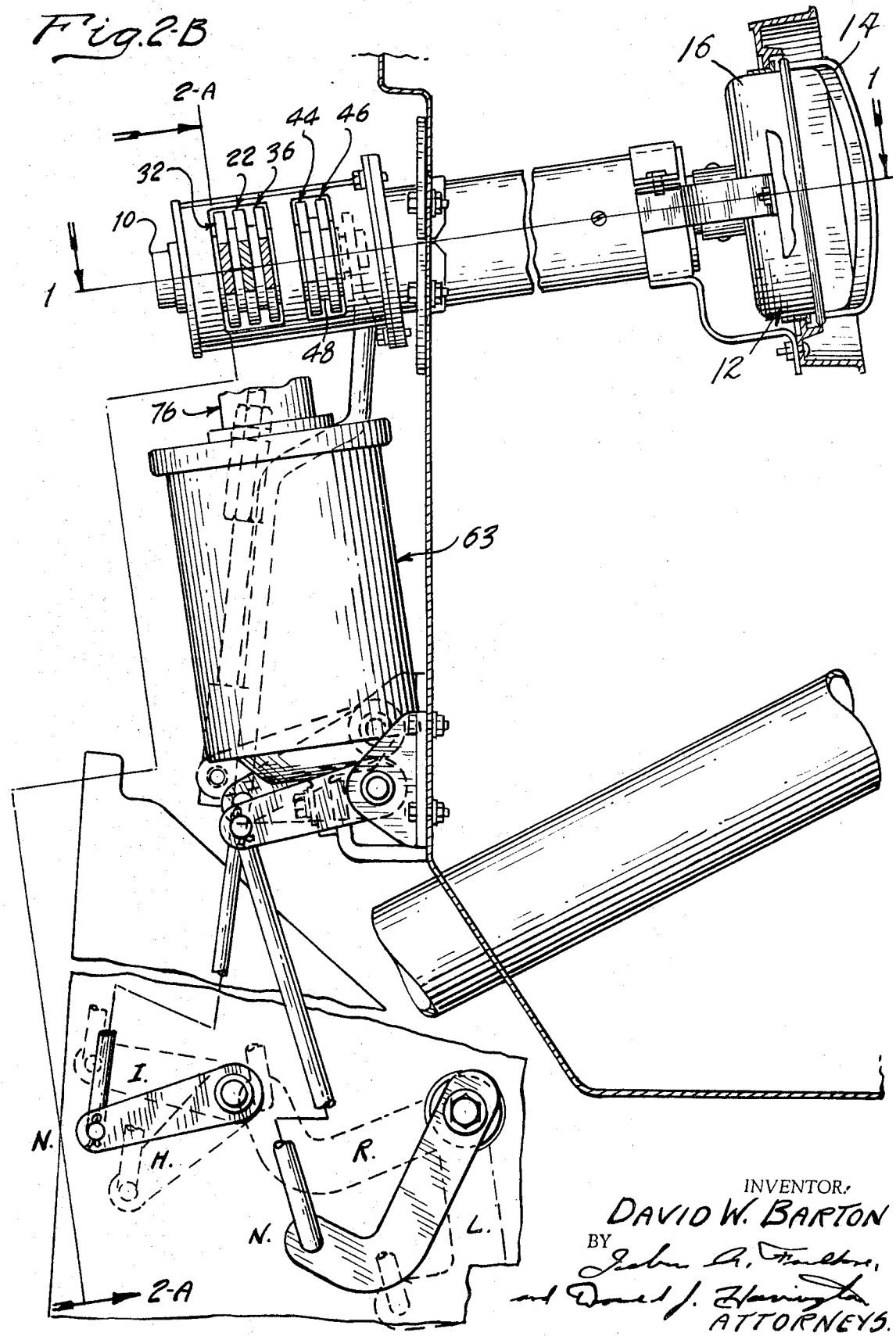

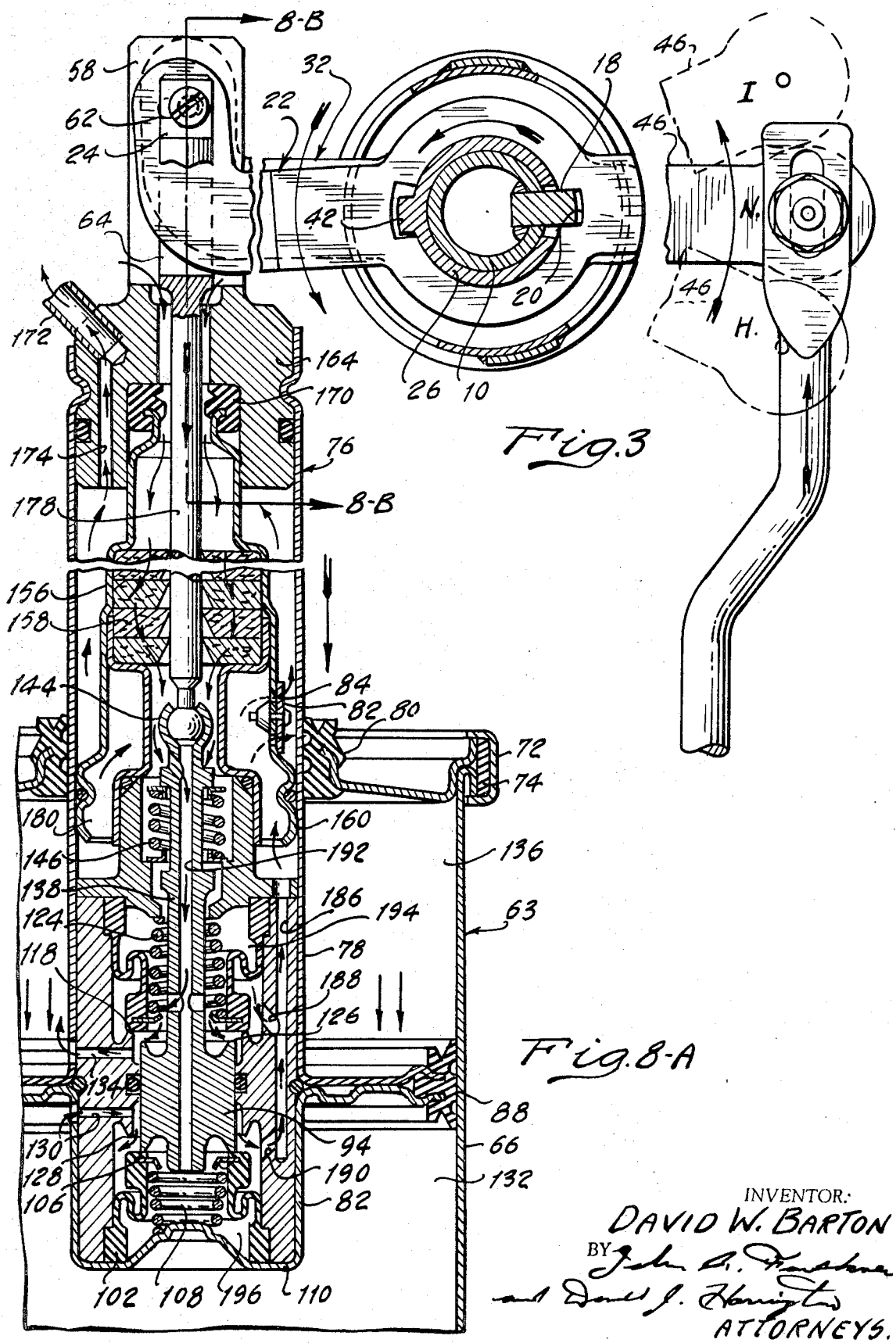

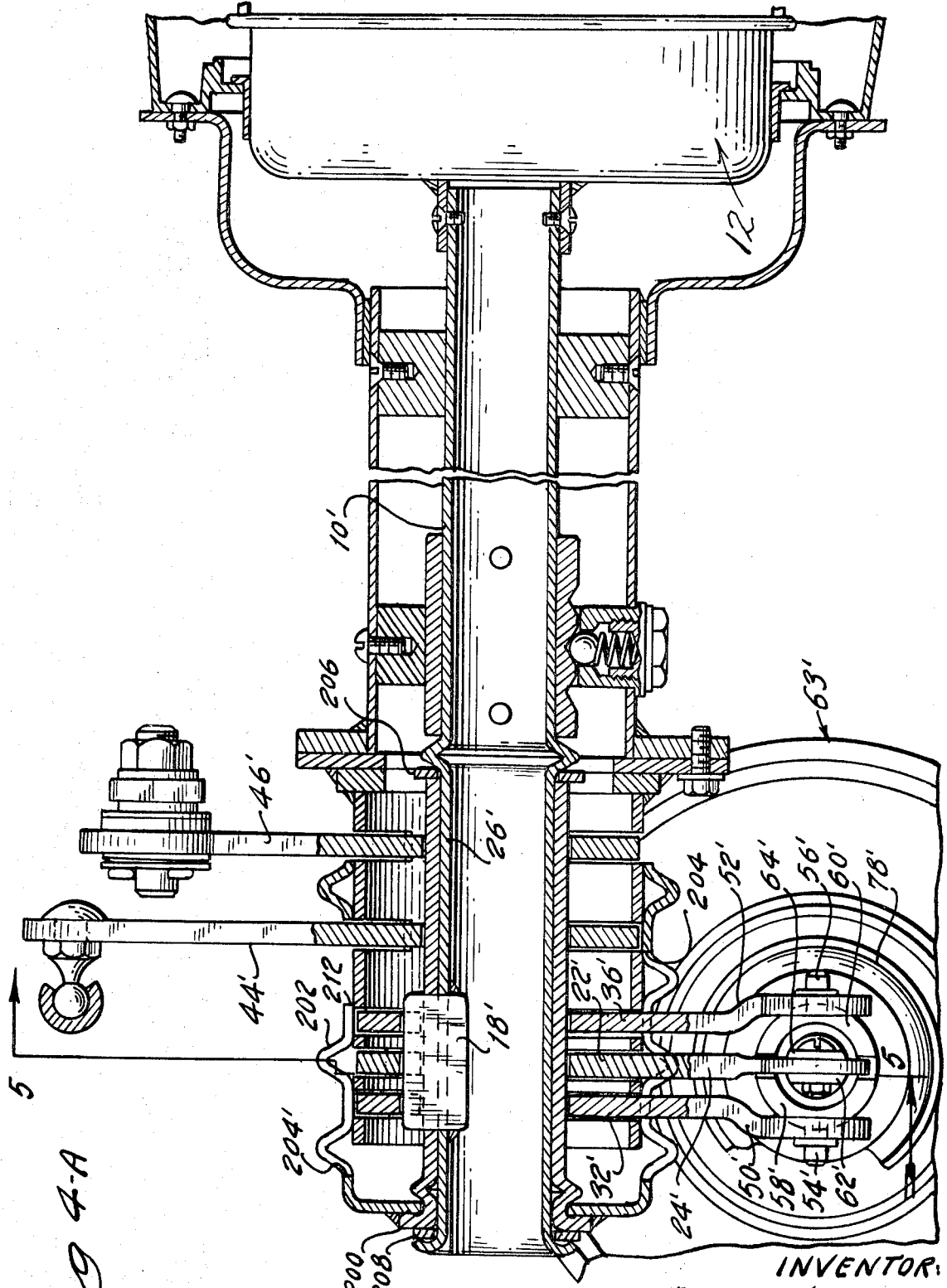

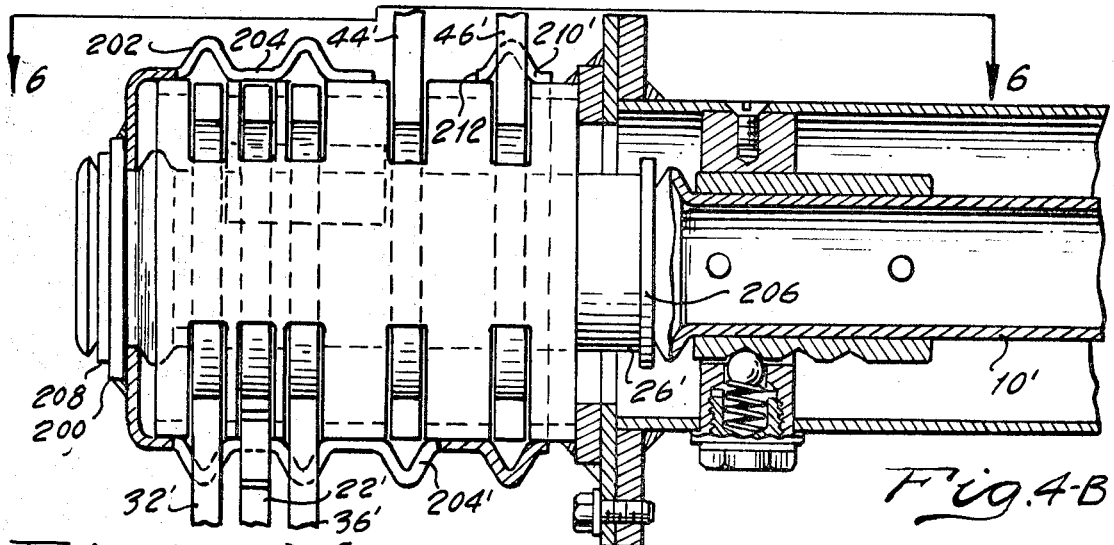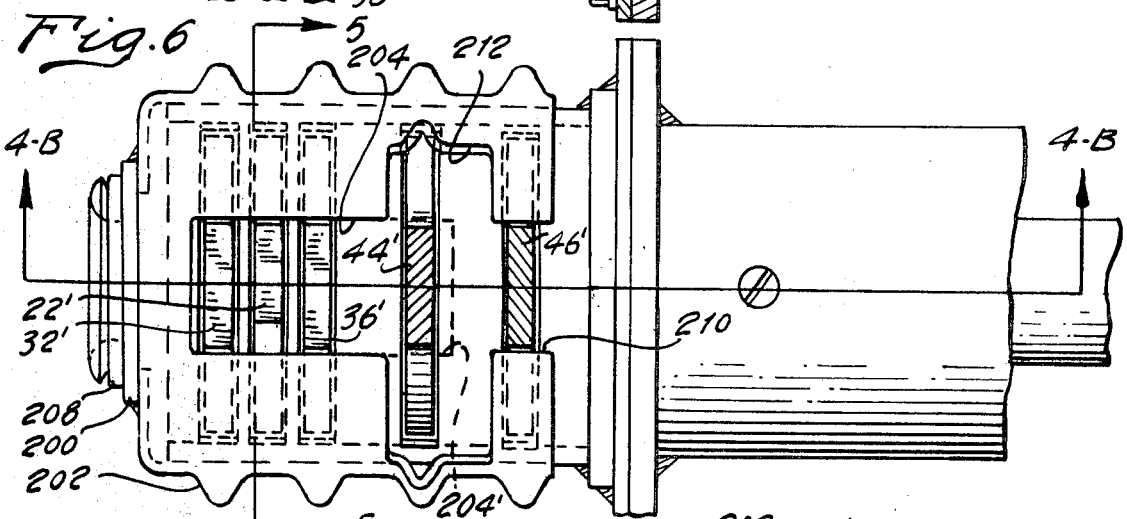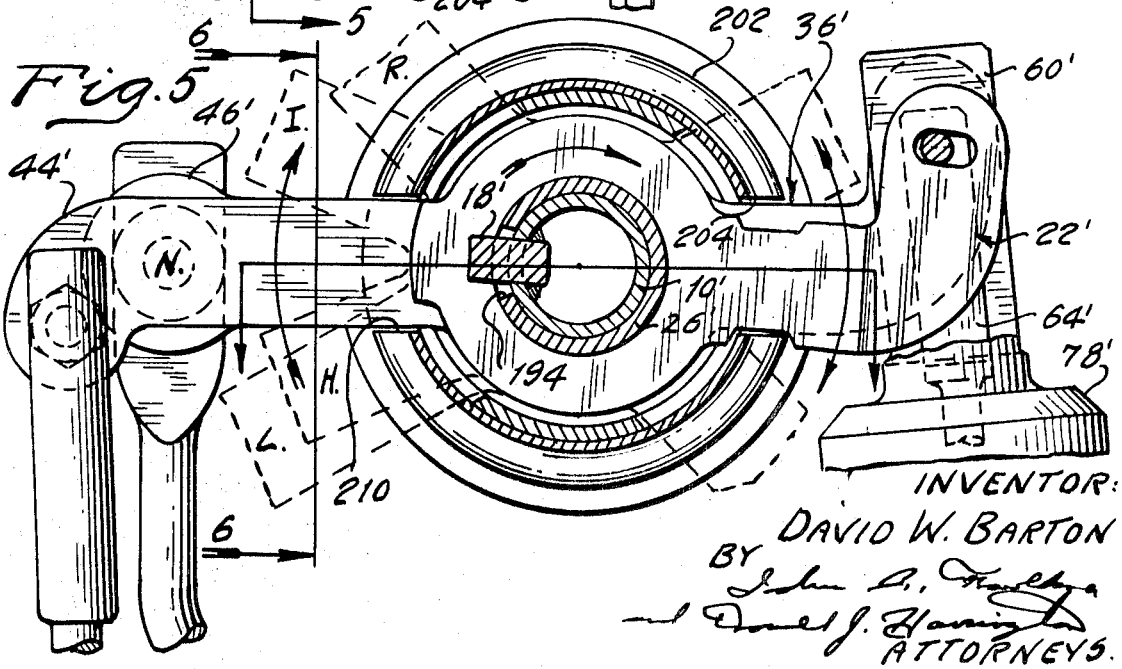

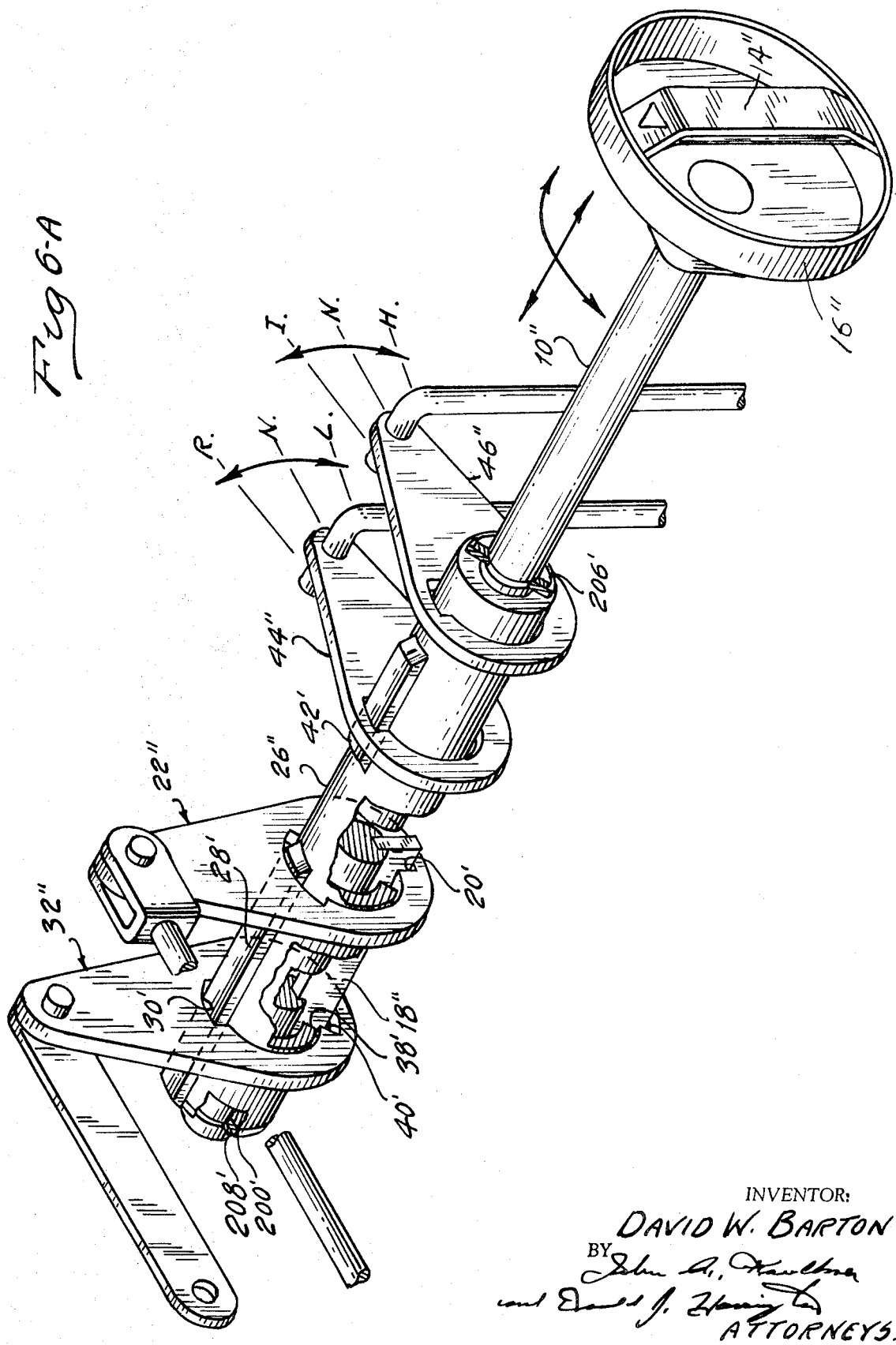

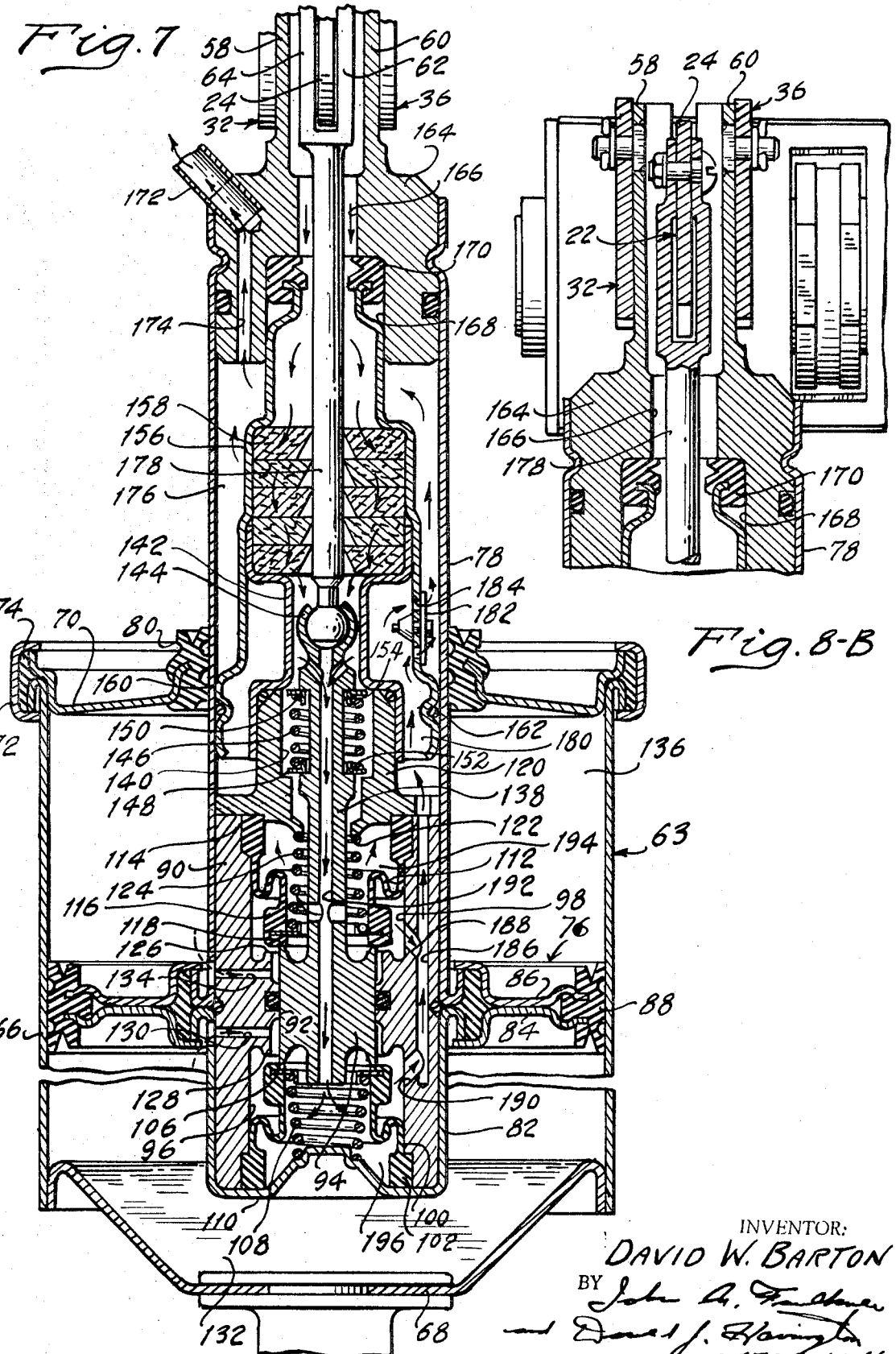

3,572,210
POWER BOOST SERVO IN A TRANSMISSION RATIO SELECTOR FOR TRANSMITTING FORCES FROM A PERSONALLY OPERABLE MEMBER TO DRIVEN ELEMENTS
David W. Barton, Birmingham, Mich., assignor to Ford Motor Company, Dearborn, Mich.
Filed Oct. 22, 1968, Ser. No. 769,583
Int. Cl. F15b 9/10; F16j 9/00
U.S. Cl. 91—376
6 Claims

ABSTRACT OF THE DISCLOSURE

A power boost mechanism for use in a transmission ratio selector comprising a personally operable shaft adapted for rotary and translatory movement by an operator, a pair of shift linkage members, clutch means for connecting selectively the personally operable shaft to each of the shift linkage members, a pressure operated servo piston connected mechanically to said shaft and valve means responsive to twisting movement of the shaft by the operator to distribute actuating fluid pressure to said servo thereby applying a pressure assist for effecting shifting movement of said shift linkage members.

GENERAL DESCRIPTION OF THE INVENTION

My invention relates generally to remote controls for multiple ratio power transmission mechanisms in an automotive vehicle driveline. The controls can be actuated by the vehicle operator with the assistance of a hydrostatic servo motor as he conditions the driveline for operation in any of several selected drive ratios.

The improvements of my invention make it possible for the driver-operated control element of a remote transmission control to be located at a convenient location within the vehicle passenger compartment. It does not require steering column mounted elements as in conventional remote control mechanism for known drivelines.

A simple rotary motion of a shift lever with reduced angular displacement is sufficient to initiate all of the transmission control functions. The shift effort required to do this is of a reduced value. The driver-initiated transmission controlling motion of the control lever triggers the operation of a pressure distribution valve in the motor, which communicates with the engine intake manifold, so that the response of the motor will assist the manual effort applied by the operator to the driver-controlled element. The power assist, however, may be manually overridden.

The shift control levers are actuated by a driver operated shaft which can be moved with rotary and axial motion. Mechanical clutches are used to effect selective connections between the shaft and the levers. Movement of the shaft to one axial position effects locking engagement of one lever with the shaft and disengagement of the other. The converse is true upon movement of the shaft axially in the other direction.

A servo motor having a pressure operated member assists in movement of the levers as the operator applies rotary motion to the shaft. This is accomplished by a mechanical connection between the pressure operated member of the servo and the shaft. Valve structure controls distribution of pressure to the servo to actuate the pressure operable member. The valve structure is under the control of the vehicle operator by means of a mechanical connection between the operator controlled shaft and the valve structure.

BRIEF DESCRIPTION OF THE FIGURES OF THE DRAWINGS

FIG. 2A is a transverse cross-sectional view taken along the plane of section line 2A—2A of FIG. 1.

FIG. 2B is a view of the structure of FIG. 1 as seen from the plane of section line 2B—2B of FIG. 2A.

FIG. 3 is a transverse cross-sectional view taken along the plane of section line 3—3 of FIG. 1.

FIG. 4A shows an alternate construction corresponding to the construction shown in FIG. 1.

FIG. 4B is a cross-sectional view along section line 4B—4B of FIG. 6.

FIG. 5 is a transverse cross-sectional view taken along the plane of section line 5—5 of FIGS. 4A and 6.

FIG. 6 is a view, partly in elevation, showing the construction of FIG. 4B as seen from the plane of section line 6—6 of FIGS. 4B and 5.

FIG. 6A shows in schematic form an isometric illustration of another embodiment of my invention.

FIG. 7 is a longitudinal cross-sectional view along section line 7—7 of FIG. 2A of a power assist motor for use with the linkage mechanisms of FIGS. 1 through 6A.

FIG. 8A shows a portion of the valve structure of FIG. 7 in a different operating position from that shown in FIG. 7.

FIG. 8B is a cross-sectional view taken along the plane of section line 8B—8B of FIG. 8A.

PARTICULAR DESCRIPTION OF THE INVENTION

Figure 1:
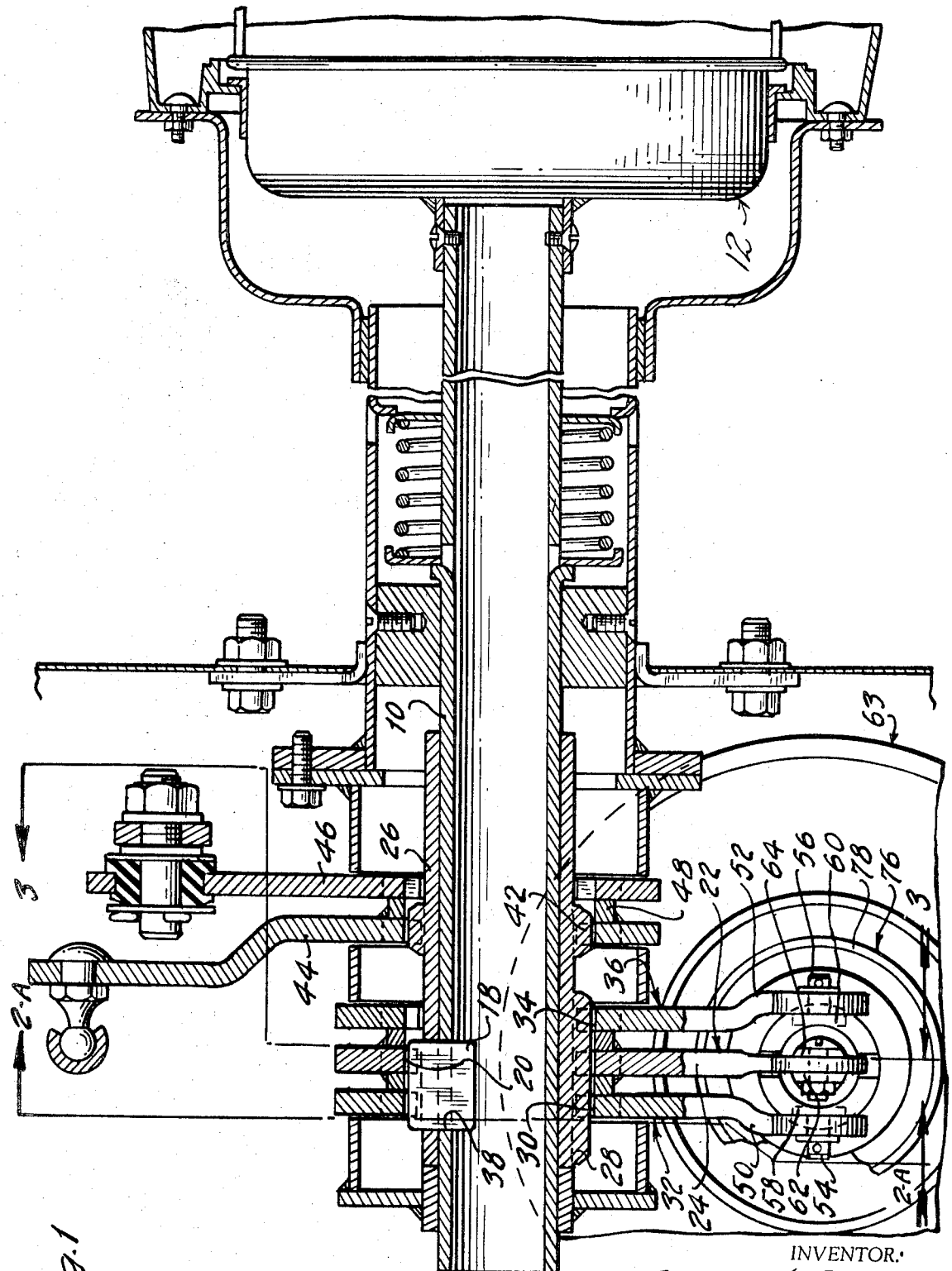
FIG. 1 is a longitudinal cross-sectional view along section line 1—1 of FIG. 2A of a portion of a linkage mechanism for a remotely-controlled shift-lever assembly for an automotive vehicle transmission system.

In FIG. 1 a shift tube or shaft is shown at 10. This may be a hollow shaft that can extend from the vehicle passenger compartment at any convenient location to the vehicle engine compartment, where the transmission control linkage elements are located. The shift tube or shaft 10 has mounted on its right-hand end a driver hand grip 12, which comprises a handle 14 and a rotary shell 16 as seen in FIGS. 1, 2B and 4A. The shell 16 can be connected directly to the shaft 10. The grip 12 can be situated adjacent the the steering wheel column of the vehicle, or it can be mounted on the vehicle dash structure, sometimes referred to as the vehicle instrument panel.

The shift tube 10 can be rotated about its axis as the grip 12 is rotated with a wrist-twist motion by the operator. Tube 10 also can be shifted axially during the ratio shift sequence. An appropriate bearing mount, not shown, can be used to accommodate both rotary motion and axial motion of the tube 10 with respect to the vehicle dash structure on which it is mounted.

The left-hand end of shaft 10, which is located within the vehicle engine compartment, is formed with a key or dog 18. This dog engages slidably a keyway or slot 20 formed in an output link 22, which will be described subsequently. The link 22 surrounds tube 10, and includes a radially extending arm 24. Relative rotary motion of the link 22 with respect to the tube 10 is inhibited while axial displacement of tube 10 with respect to the link 22 is accommodated.

Surrounding the base or left-hand end of the tube 10 is a clutch sleeve 26. Formed on the sleeve 26 is an external dog tooth or key 28 which is adapted to register with a dog clutch recess 30 formed in a first output link 32. It is received also within a recess 34 formed in a second output link 36. The links 32 and 36 surround the sleeve 26. Both the sleeve 26 and the link 32 are cut away as shown at 38 and 40 to permit permanent clearance between these elements and the key 28. The link 36 is similarly formed with a clearance region for preventing interference with the key 28 as the latter rotates about the axis of the tube 10.

The drive clutch sleeve 26 includes also dog clutch teeth 42 which selectively engage internal dog clutch teeth formed in shift links 44 and 46. These links include openings to permit the sleeve 26 to pass through them as the teeth 42 selectively engage the links. A spacer 48 separates the links 44 and 46 so that they can be held in proper spaced relationship as the selection is made by the sleeve 26.

Sleeve 26 is shifted axially by the drive dog 18, which extends through the opening 38 in the sleeve 26.

Output links 32 and 36 include radially extending arms 15 and 52 which are pinned by means of pins 54 and 56 to yoke arms 58 and 60, respectively. These yoke arms are formed on a movable element of the hydrostatic motor, as will be described with reference to FIG. 7.

The radially outward end of the input link 24 is pinned at 62 to the extended end of a valve operator input rod 64.

Referring next to FIG. 7, I have designated generally a power booster motor assembly by reference character 63. It includes a power cylinder 66 having an end wall 68 and an end cover 70. The cover is held in place at the right-hand margin of the cylinder 66 by means of a retainer band 72. The connection thus established is sealed by a seal ring 74.

A piston assembly 76 is located within the cylinder 66. It includes a cylindrical body 78, which extends through a central opening formed in the end cover 70. The body 78 is sealed with respect to the cover 70 by a circular rod seal 80. The piston assembly 76 includes also a second cylindrical body portion 82. In the particular embodiment shown in FIG. 7, body portion 82 is flanged to provide a connection with wall 84 and a corresponding flange 86 is formed on body portion 78 to provide a connection with wall 86. The walls 84 and 86 are arranged in juxtaposed relationship and are secured together by welding or by rivets. The outer margin of walls 84 and 86 carry a circular seal 88, which slidably engages in sealing relationship the inner surface of the cylinder 66.

Located within the housing portions 82 and 78 is a valve body 90 of cylindrical construction. It includes a central, circular valve opening 92 within which is slidably positioned a valve spool 94. Formed at one end of valve body 90 is diaphragm chamber 96. A companion diaphragm chamber 98 is formed in the other end of the valve body 90. A seal member in the form of a flexible diaphragm 100 engages the inner wall of the chamber 96 formed in the valve body 90. This is indicated at 102. The other margin of the diaphragm 100 forms a seal ring 104, which engages a valve seat 106 formed on one end of the valve spool 94. The seal ring 104 is urged into sealing engagement with the seat 106 by a valve spring 108 which is seated on the end wall 110 of the body portion 82. Spring 108 engages a circular valve seat carried by the ring 104.

A second seal in the form of a flexible diaphragm is located in chamber 98 as shown at 112. One margin 114 of diaphragm 112 seals and engages the inner peripheral wall of the chamber 98. The other margin of the diaphragm 112, as shown at 116, is adapted to engage an annular valve seat 118 formed on the valve spool 194.

A valve cover 120 is secured to one end of the valve body 90. It engages the margin 114 of the diaphragm 112, thereby holding it axially fast. In like manner, end wall 110 of the body portion 82 engages and holds axially fast the margin 102 of the diaphragm 100. The valve cover 120 is formed with an internal annular shoulder 122 which anchors a diaphragm spring 124. This spring engages a spring seat carried by the periphery 116 of the diaphragm 112, thereby urging the periphery 116 into sealing engagement with a valve seat 118.

The springs 108 and 124 tend to urge the valve spool 94 to a neutral position within the valve body 90. When it assumes that position, the periphery 116 is spaced from adjacent annular valve land 126 formed in the inner end of the diaphragm chamber 98. Another internal annular valve land 128 is formed in the other end of diaphragm chamber 96. When the spool 94 is in the neutral position shown in FIG. 7, the annular periphery 104 of diaphragm 100 is spaced slightly from land 128. The valve chamber 92 communicates with a pressure distribution port 130 at a location adjacent land 128. Port 130 communicates with servo chamber 132 formed in the cylinder 66. In a similar fashion port 134 connects servo chamber 136 with a valve chamber 92, the port 194 communicating with the valve chamber 92 adjacent land 126.

Spool 94 is connected to or is formed internally with a valve stem 138. This stem extends through an opening 140 formed in valve cover 120. A valve sleeve 142 surrounds and is connected to the right-hand end of the valve cover 120 and the valve stem 138 is received within it as shown at 144.

A valve centering spring 146 is located in the opening 140. It is situated in a pre-stressed condition between thrust washers 148 and 150. These washers engage internal shoulders formed by the valve cover 120 and by the valve sleeve 142. They engage also shoulders 152 and 154 formed on the valve stem 138.

The spring 146 thus acts to center the spool 94 with respect to the valve body 90. It also induces a resistance to shifting movement of the spool with respect to the valve body. This resistance can be felt by the vehicle operator since it is transmitted mechanically through the valve operating linkage mechanism, which in turn is actuated by the vehicle operator. The operator thus experiences a desirable control feel or sensation that permits him to control more precisely the shift lever position as speed ratio changes are made.

An air filter housing 156 is secured to the right-hand end of the sleeve 142. It encloses air filter material 158 which filters air as it passes through the housing 156. A circular shroud 160 is secured to the housing 156. A sealing ring 162 carried by the shroud 160 slidably engages the inner surface of the cylindrical housing portion 78.

A circular closure member 164 is received within the end of the housing portion 78 and is held fixed therein by crimping, as indicated. Closure 164 is centrally apertured, as shown at 166, to receive therethrough valve operating rod 178. A large diameter central opening 168 in the closure member 164 receives the right-hand end of the circular housing 156. A fluid seal 170 establishes a sealed connection between opening 166 and the interior of the air filter housing.

Closure member 164 receives also an intake manifold connection 172, which is adapted to be connected to a manifold pressure passage extending to the intake manifold of the internal combustion engine. That pressure is defined in part by passage 174 in member 164 and by annular chamber 176 formed by the housing portion 78 and the cooperating filter housing 156 with its extension 160.

Valve stem 138 is connected to valve operating rod 178 by means of a ball and slide connection at the end 144. The rod 178 passes through the filter material 158.

The cavity 180 within the housing portion 78, which cavity is situated directly to the right of the valve cover 120, communicates with chamber 176 through a one-way check valve 182. Preferably this valve is in the form of a valve plate carried by a valve stem, which in turn is connected to the portion 160 of the filter housing 156. The valve plate is adapted to seal valve ports 184 when the pressure in chamber 176 exceeds the pressure in chamber 180. On the other hand, when the pressure in the chamber 176 is less than the pressure in the chamber 180, the valve plate will open the orifice 184 thereby establishing one-way fluid flow from the chamber 180 to the chamber 176.

Chamber 180 communicates with an internal passage 186 formed in the valve 90 which in turn communicates with each of two ports 188 and 190. These communicate, respectively, with one side of the flexible diaphragms 100 and 112 on the inner ends of the associated diaphragm chambers 96 and 98.

The valve stem 138 and the spool 94 are formed with a central passage 192 which is in communication with spring chamber 194 on one side of diaphragm 112 and with spring chamber 196 on one side of diaphragm 100. Passage 192 communicates also with an interior sleeve 142 on the left-hand side of the filter material 158. The right-hand side of the filter material 158 communicates with the atmosphere through opening 166.

The driver, during ratio shift changes, can grip the rotary hand grip 12 and shift the shift tube 10 both axially and rotatably. When he shifts the tube axially, the dog 18 will cause sleeve 26 also to shift axially so that it can establish a driving connection between teeth 42 and either one or the other of the shift levers 44 and 46. When the desired shift lever is engaged, the tube 10 can be shifted rotatably by the operator, thereby causing shifting movement of the selected lever 44 or 46. Appropriate ratio changes then can be accomplished.

The shaft 10 is secured to the servo valve input link 22 so that the two rotate together with zero backlash.

The key 28 is continuously registered with recesses 30 and 34 regardless of the axial position of the sleeve 26. After the proper axial position is selected, sleeve 26 can be rotated by applying turning torque to the shaft 10. This will cause servo valve input link 22 to move the rod 170 and the valve spool 94 in a downward direction, as viewed in FIG. 7. To accomplish this the preload spring 146 must be overcome and this resistance is felt by the operator as a control sensation. When this preload is overcome, spool 94 will be shifted until the periphery 116 of the diaphragm 112 engages the seat 126. This will establish fluid communication between chamber 194 and chamber 136 through the port 134. Chamber 136 then becomes subjected to atmospheric pressure as atmospheric air passes through passage 166, to the filter housing 156, and through passage 192. At this time sealing contact is maintained between land 106 and the periphery 104 of the diaphragm 100.

Atmospheric pressure is made available to the lower side of the diaphragm 100 thereby assisting spring 180 in maintaining this sealing contact. The lower side of diaphragm 112 communicates with passage 186, which is subjected to intake manifold pressure. This helps maintain the periphery 116 of the diaphragm 112 in sealing engagement with the land 118. Similarly, the upper side of the diaphragm 100 communicates with passage 186 to produce a pressure unbalanced across the diaphragm 100 while maintaining sealing contact between the periphery 104 of the diaphragm 100 and land 106.

Passage 186 is evacuated to produce a reduced pressure therein as it communicates with the engine intake manifold through chambers 180, check valve 182, chamber 176 and passage 174. The pressure unbalance created across the piston tends to urge the piston in the downward direction, as viewed in FIG. 7. This then will cause the power cylinder output links 32 and 36 to rotate. After the lost motion between key 28 and the recesses 30 and 34 is taken up, sleeve 26 rotates about its axis with a follow-up motion as the shift tube 10 continues to rotate. Either one or the other of the shift links 44 or 46 then is actuated.

Shifting movement of the shift tube 10 in the opposite direction will cause valve spool 94 and valve stem 138 to shift in the upward direction, as viewed in FIG. 7. Shifting motion relative to the body 90 occurs as soon as the preload of spring 146 is overcome.

An effective seal then is established between land 118 and the periphery 116 of the diaphragm 112. At the same time, when the gap between land 128 and the periphery 104 of diaphragm 100 is taken up, the seal between periphery 104 and the land 106 will be broken. This establishes fluid communication between passage 192 and port 130 and allows atmospheric air to pass through the filter, through passage 192, through port 130 and into the chamber 132. At the same time communication is established between the engine intake manifold and the chamber 136. This communication takes place through port 134, through chamber 194, through opening 140 and opening 166. This will result in a pressure unbalance across the piston, which will cause the piston assembly to move in the leftward direction. The piston then powers the cylinder output links 32 and 36 to cause shifting movement of the appropriate shift links.

The dog clutch element 18 thus serves a triple purpose. It serves first to establish a connection between tube 10 and sleeve 26 to cause the sleeve 26 to shift axially for selection of the appropriate shift link 44 and 46. Secondly, it establishes a positive mechanical connection between the shift tube 10 and the servo input link 22 causing actuation of the servo valve. Thirdly, the dog clutch element 18 is effective to establish a direct mechanical connection between the shift links 44 and 46 and the shift tube 10.

In the event of a power failure, which will prevent operation of the booster 63, the operator can shift the shift links 44 and 46 in either one direction or the other. A certain lost motion will exist between dog element 18 and the sleeve 26 by reason of the cut-away part 38 or by reason of the lost motion between the key 18 and the cut-away part 40 of the output links. As soon as this lost motion is taken up, however, a direct mechanical drive between the shift links and the tube 10 is established.

In FIGS. 4, 5 and 6 I have illustrated an alternate rotary shift linkage mechanism. It has a function similar to the function of the shift linkage mechanism illustrated in FIG. 1, and the elements of the alternate construction that have counterpart elements in the FIG. 1 construction have been designated by similar reference characters, although prime notations have been added. In this alternate construction key 18' directly connects the shift tube 10' to the valve operator input link 22'. As indicated in FIG. 5, a lost motion slot 198 is formed in sleeve 26'.

Secured at 200 to the sleeve 26' is a drive shell in the form of a drum 202. This surrounds sleeve 26'. It includes a slot 204 extending axially, as best indicated in FIG. 6. The links 32', 22' and 36' extend radially outwardly from the sleeve 26' through slot 204.

Minimum clearances are provided between links 32' and the sides of the slot 204, and between the link 36' and the sides of the slot 204. A substantial lost motion is provided, however, between the slot 204 and the valve operator input link 22'. This will permit the vehicle operator to actuate the valve through the link 22', and the links 32' and 36' drive the shift linkage for the transmission with a follow-up motion as in the previous embodiment.

As seen also in the previous embodiment, the sleeve 26', which corresponds to the previously described sleeve 26, slides axially upon axial movement of the shift tube. It is held axially fast on the tube by thrust bearings 206 and 208, which in turn are anchored against shoulders formed on the tube 10'. The drum 202 is formed with a second slot 210 which is adapted to be shifted selectively into alignment with either one or the other of the shift links 44' and 46'.

When the sleeve 26' is shifted to the position shown in FIG. 4, the drum 202 assumes the position shown in FIG. 6. At that time slot 210 is aligned with shift link 46'. Thus as the tube 10' is rotated, the link 46' can be oscillated about the axis of the tube 10'.

When oscillation takes place in this fashion, link 44' is not affected. This is due to the fact that the slot 210 and the slot 204 are joined by a cut-away region 212 of substantial arcuate extent. The drum 202 does not influence the angular position of the shift link 44' when the sleeve 26' assumes the position shown. If the sleeve 26' is shifted in a left-hand direction by the shift tube 10', however, link 244' becomes aligned with slot 210. Subsequent rotation of the tube 10' then will cause motion of the link 44'. At that time, however, link 46' is situated on the right-hand side of the drum 202 where the latter has no influence on the shift link position.

In FIG. 6 I have shown in schematic, isometric form an alternate construction that is very similar to the FIG. 1 arrangement. For this reason the elements of the FIG. 6 construction have been indicated by similar reference characters, although double prime notations have been added for purposes of clarity.

The shift tube 10″, which corresponds to the tube 10 of FIG. 1, is adapted to shift the sleeve 26″ as it is adjusted axially. Thrust washers 206″ and 208″ hold the sleeve 26″ axially fast with respect to the tube 10″. The mode of operation of the FIG. 6 embodiment is substantially the same as the mode of operation of the FIG. 1 embodiment, and a particular description of it is not required for an understanding of it.

Having described a preferred form of my invention, what I claim and desire to secure by U.S. Letters Patent is:

1. A power boost servo for transmitting forces from a personally operable member to driven elements comprising a cylinder, a piston assembly in said cylinder, a valve body in said piston assembly, means for connecting said piston assembly to said driven elements, said piston assembly and said cylinder cooperating to define a pair of opposed working chambers, conduit structure defined by said piston assembly, means for connecting said conduit structure to a pressure source, said valve body being situated in and partly defining said conduit structure and adapted to connect said source selectively to said chambers, said valve body comprising a valve chamber in said piston assembly, a valve spool slidably positioned in said valve chamber, a valve operating rod connected to said valve spool and adapted for displacement relative to said piston assembly, a circular seal in the form of a diaphragm having one margin thereof connected to said piston assembly, an annular valve land on said valve spool engageable with the inner periphery of said diaphragm, a shoulder formed on said piston assembly in said valve chamber adjacent said valve land, a pressure passage extending from one side of said diaphragm to an ambient pressure region, said valve spool being normally in a neutral, centered position to define a space between said inner periphery and said shoulder which defines in part said conduit structure, said diaphragm sealing said conduit structure upon movement of said spool in one direction as said inner periphery engages said shoulder and said valve land disengages said periphery whereby ambient pressure is distributed to said working chamber and communication between said pressure source and said working chamber is interrupted, said valve means comprising a second valve land and a second diaphragm situated in spaced relationship with respect to said first diaphragm, the inner periphery of said second diaphragm engaging normally said valve spool, the outer periphery of said second diaphragm being connected to said piston assembly, a second valve shoulder formed on said piston assembly in said valve chamber in spaced relationship with respect to said inner periphery of said second diaphragm when said valve spool assumes a centered position thereby defining a space that is situated in and partly defines a portion of said conduit structure communicating with the other working chamber, the inner peripheries of both diaphragms being situated in spaced relationship with respect to said valve shoulders when said valve spool is centered between said shoulders whereby each pressure chamber and the innermost sides of said diaphragm communicate with said pressure source.

2. The combination as set forth in claim 1 including spring means opposing resiliently displacement of said valve spool with respect to said piston assembly and urging said valve spool toward said centered neutral position.

3. The combination as set forth in claim 2 wherein said personally operable member is connected mechanically to said valve spool through said valve operating rod whereby displacement of said valve spool against the opposing forces and the centering spring is followed by movement of said piston assembly and said driven elements with a follow-up motion to provide a power assist.

4. The combination as set forth in claim 1 wherein the connection with the ambient pressure region includes a passage formed in said piston assembly communicating with the outboard sides of each of said diaphragms, and a filter medium in said ambient pressure passage.

5. The combination as set forth in claim 4 including one-way flow check valve means in said conduit structure for accommodating pressure distribution in one direction between said piston assembly and said pressure source while inhibiting pressure distribution in the opposite direction.

6. The combination as set forth in claim 4 wherein the said personally operable member is connected mechanically to said valve spool through said valve operating rod whereby displacement of said valve spool against the opposing forces and the centering spring is followed by movement of said piston assembly and said driven elements with a follow-up motion to provide a power assist.

References Cited

UNITED STATES PATENTS

| 1,679,762 | 8/1928 | Bragg et al. | 91—376 |
| 3,237,526 | 3/1966 | Hayes et al. | 91—376 |

FOREIGN PATENTS

| 424,653 | 8/1947 | Italy | 91—378 |

PAUL E. MASLOUSKY, Primary Examiner

U.S. Cl. X.R.

92—249